US010869298B2

(12) United States Patent
Marupaduga et al.

(10) Patent No.: US 10,869,298 B2
(45) Date of Patent: Dec. 15, 2020

(54) WIRELESS COMMUNICATION SYSTEM CONTROL OF CARRIER AGGREGATION FOR A WIRELESS RELAY

(71) Applicant: Sprint Communications Company L.P., Overland Park, KS (US)

(72) Inventors: Sreekar Marupaduga, Overland Park, KS (US); Saravana Velusamy, Overland Park, KS (US); Vanil Parihar, Overland Park, KS (US); Nitesh Manchanda, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 25 days.

(21) Appl. No.: 16/248,131

(22) Filed: Jan. 15, 2019

(65) Prior Publication Data

US 2019/0150119 A1 May 16, 2019

Related U.S. Application Data

(63) Continuation of application No. 15/278,491, filed on Sep. 28, 2016, now Pat. No. 10,225,821.

(51) Int. Cl.
*H04W 72/04* (2009.01)
*H04L 5/00* (2006.01)
*H04B 7/14* (2006.01)
*H04W 40/22* (2009.01)
*H04W 88/08* (2009.01)

(52) U.S. Cl.
CPC .............. *H04W 72/04* (2013.01); *H04B 7/14* (2013.01); *H04L 5/001* (2013.01); *H04W 40/22* (2013.01); *H04W 88/08* (2013.01)

(58) Field of Classification Search
CPC ..... H04W 72/04; H04W 40/22; H04W 88/08; H04B 7/14; H04L 5/001
See application file for complete search history.

(56) References Cited

U.S. PATENT DOCUMENTS

| 9,179,325 | B2 | 11/2015 | Yuan et al. | |
|---|---|---|---|---|
| 9,236,979 | B2 | 1/2016 | Park et al. | |
| 9,351,309 | B1 | 5/2016 | Hinkle et al. | |
| 9,801,116 | B1 * | 10/2017 | Oroskar | H04L 5/0037 |
| 9,807,672 | B1 * | 10/2017 | Singh | H04W 52/34 |
| 9,877,263 | B1 * | 1/2018 | Oroskar | H04W 4/06 |
| 2010/0329216 | A1 | 12/2010 | Jen | |

(Continued)

Primary Examiner — Wutchung Chu

(57) ABSTRACT

A wireless access point transfers first user data to a first User Equipment (UE) in first carrier-aggregated resource blocks according to an initial UE Carrier Aggregation (CA) schedule. The wireless access point transfers second user data to a wireless relay in second carrier-aggregated resource blocks according to an initial relay CA schedule. The wireless relay transfers the second user data to a second UE. The wireless access point translates the amount of first user data into a new UE CA schedule and a new relay CA schedule. The wireless access point transfers third user data to the first UE in third carrier-aggregated resource blocks according to the new UE CA schedule. The wireless access point transfers fourth user data to the wireless relay in fourth carrier-aggregated resource blocks according to the new relay CA schedule. The wireless relay transfers the fourth user data to the second UE.

18 Claims, 6 Drawing Sheets

(56) References Cited

U.S. PATENT DOCUMENTS

| | | | |
|---|---|---|---|
| 2012/0120831 A1 | 5/2012 | Gonsa et al. | |
| 2012/0163288 A1 | 6/2012 | Kim et al. | |
| 2012/0201191 A1 | 8/2012 | Seo et al. | |
| 2012/0322486 A1 | 12/2012 | Kameno et al. | |
| 2013/0040683 A1* | 2/2013 | Siomina | H04W 28/0236 455/517 |
| 2013/0163543 A1* | 6/2013 | Freda | H04W 16/14 370/329 |
| 2014/0010207 A1* | 1/2014 | Horn | H04W 36/165 370/332 |
| 2014/0307623 A1* | 10/2014 | Gheorghiu | H04W 76/16 370/328 |
| 2015/0063259 A1 | 3/2015 | Gohari et al. | |
| 2015/0189652 A1 | 7/2015 | Mizusawa | |
| 2015/0271852 A1* | 9/2015 | Rahman | H04W 72/0413 370/329 |
| 2015/0305041 A1* | 10/2015 | Kim | H04L 5/0037 370/329 |
| 2015/0327255 A1 | 11/2015 | Tamaki et al. | |
| 2015/0358969 A1* | 12/2015 | Choi | H04W 72/0486 370/329 |
| 2016/0021592 A1* | 1/2016 | Vesely | H04W 76/15 370/331 |
| 2016/0044593 A1* | 2/2016 | Anpat | H04W 4/70 370/329 |
| 2016/0050605 A1* | 2/2016 | Kim | H04W 28/0263 370/331 |
| 2016/0073283 A1* | 3/2016 | Grayson | H04W 40/02 370/230 |
| 2016/0234718 A1* | 8/2016 | Thangarasa | H04W 76/15 |
| 2016/0249259 A1* | 8/2016 | Park | H04W 36/0055 |
| 2016/0285539 A1* | 9/2016 | Sadiq | H04W 8/005 |
| 2017/0006607 A1* | 1/2017 | Etemad | H04W 72/042 |
| 2017/0317740 A1* | 11/2017 | Basu Mallick | H04W 8/005 |
| 2018/0069618 A1* | 3/2018 | Loehr | H04W 72/1263 |
| 2018/0219652 A1* | 8/2018 | Chen | H04B 7/0626 |

* cited by examiner

WIRELESS COMMUNICATION SYSTEM CONTROL OF CARRIER AGGREGATION FOR A WIRELESS RELAY

CROSS REFERENCE TO RELATED APPLICATIONS

This application is a continuation of, and claims the benefit of priority to, U.S. patent application Ser. No. 15/278,491, entitled "WIRELESS COMMUNICATION SYSTEM CONTROL OF CARRIER AGGREGATION FOR A WIRELESS RELAY," filed on Sep. 28, 2016, and which is hereby incorporated by reference in its entirety.

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication. Some wireless communication systems use Orthogonal Frequency Division Multiplexing (OFDM) to exchange wireless data with UEs. In OFDM communication systems, resource blocks are used to transfer data simultaneously over various time slots and frequency carriers. One popular wireless communication system that uses the resource block allocation scheme of OFDM communication systems is Long Term Evolution (LTE) communication networks.

To expand or enhance the wireless signal coverage of a wireless communication network, wireless communication relays are added to locations not adequately covered by current network infrastructure. A relay exchanges wireless signaling and data between UEs and another wireless access point. Without the signal repetition provided by the wireless relay, the coverage area of the wireless network access point may otherwise have not extended far enough to serve the UEs using the relay. Thus, a wireless relay provides a less resource intensive means for increasing wireless network coverage. Wireless relays typically backhaul traffic through a communication link to a donor base station.

A wireless communication system may employ Carrier Aggregation (CA). CA allows communication networks, such as Long Term Evolution (LTE) networks, to use multiple resource blocks simultaneously for a UE. A UE uses uplink CA to increase data throughput and transmission speeds to a wireless relay or donor base station. Wireless communication systems can aggregate carriers over frequencies bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands.

Wireless communication networks allow multiple relays and UEs to be connected to a donor base station. CA configurations for relays and UEs may be set up upon attachment and may be determined based on the combination of relays and UEs attached to the wireless communication network. While providing CA to both relays and UEs may allow higher throughput rate, this may also lead to a limited number of resources available to relays serving additional relays and UEs which require additional downlink tonnage. Unfortunately, existing CA configuration determinations do not differentiate between UEs and relays and therefore, a method to dynamically control CA for relays and UEs is needed.

TECHNICAL OVERVIEW

A wireless access point transfers first user data to a first User Equipment (UE) in first carrier-aggregated resource blocks according to an initial UE Carrier Aggregation (CA) schedule. The wireless access point transfers second user data to a wireless relay in second carrier-aggregated resource blocks according to an initial relay CA schedule. The wireless relay transfers the second user data to a second UE. The wireless access point translates the amount of first user data into a new UE CA schedule and a new relay CA schedule. The wireless access point transfers third user data to the first UE in third carrier-aggregated resource blocks according to the new UE CA schedule. The wireless access point transfers fourth user data to the wireless relay in fourth carrier-aggregated resource blocks according to the new relay CA schedule. The wireless relay transfers the fourth user data to the second UE.

DETAILED DESCRIPTION

Figure 1:
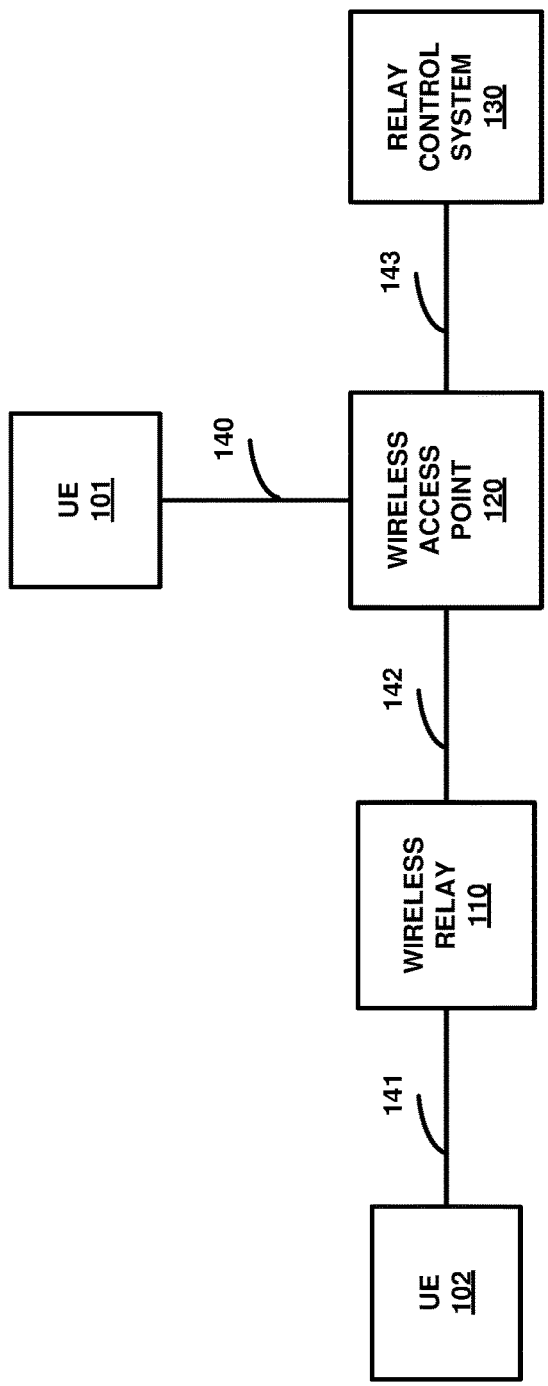
FIGS. 1-3 illustrate a wireless communication system to control Carrier Aggregation (CA) at a wireless relay.
Figure 2:
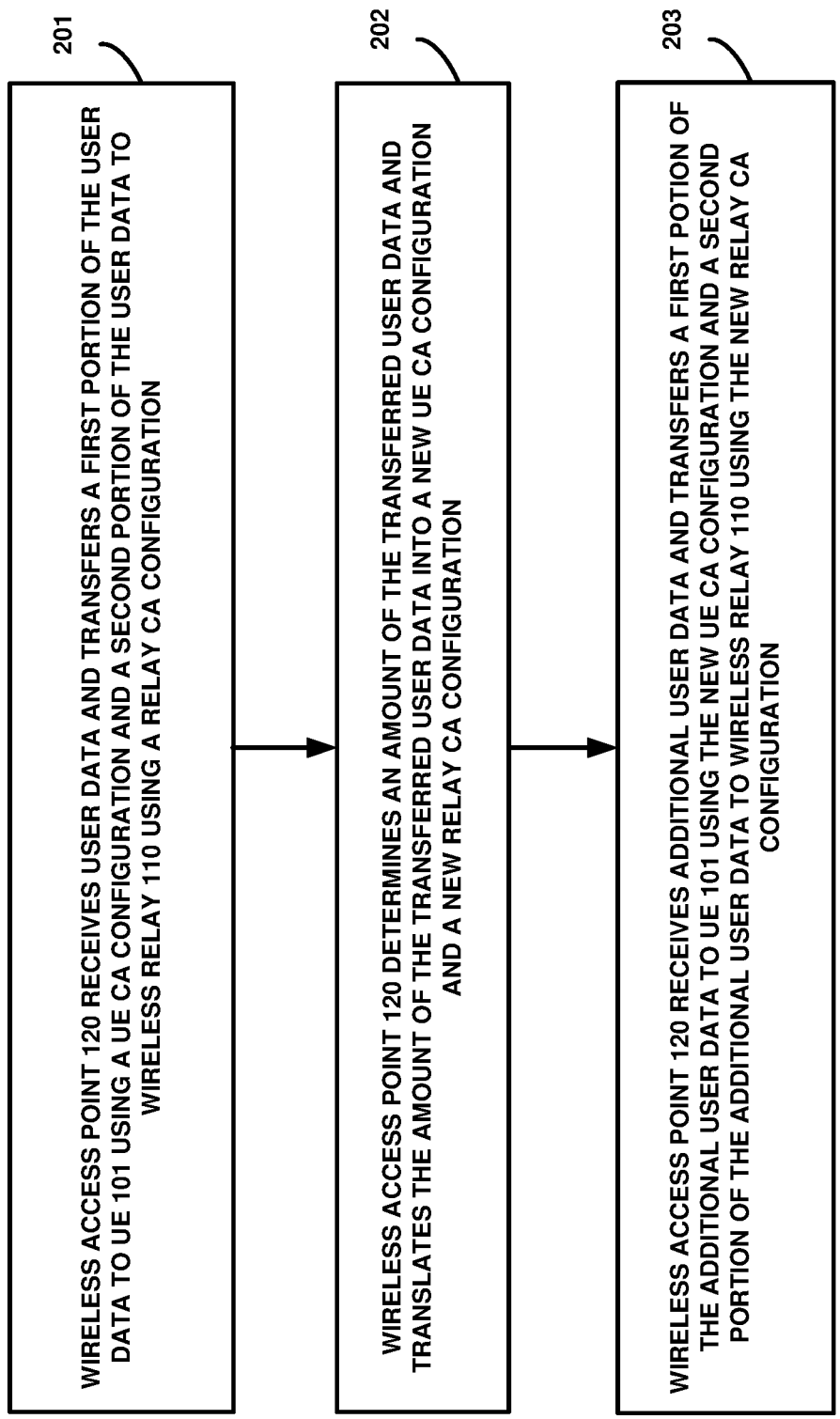
Figure 3:
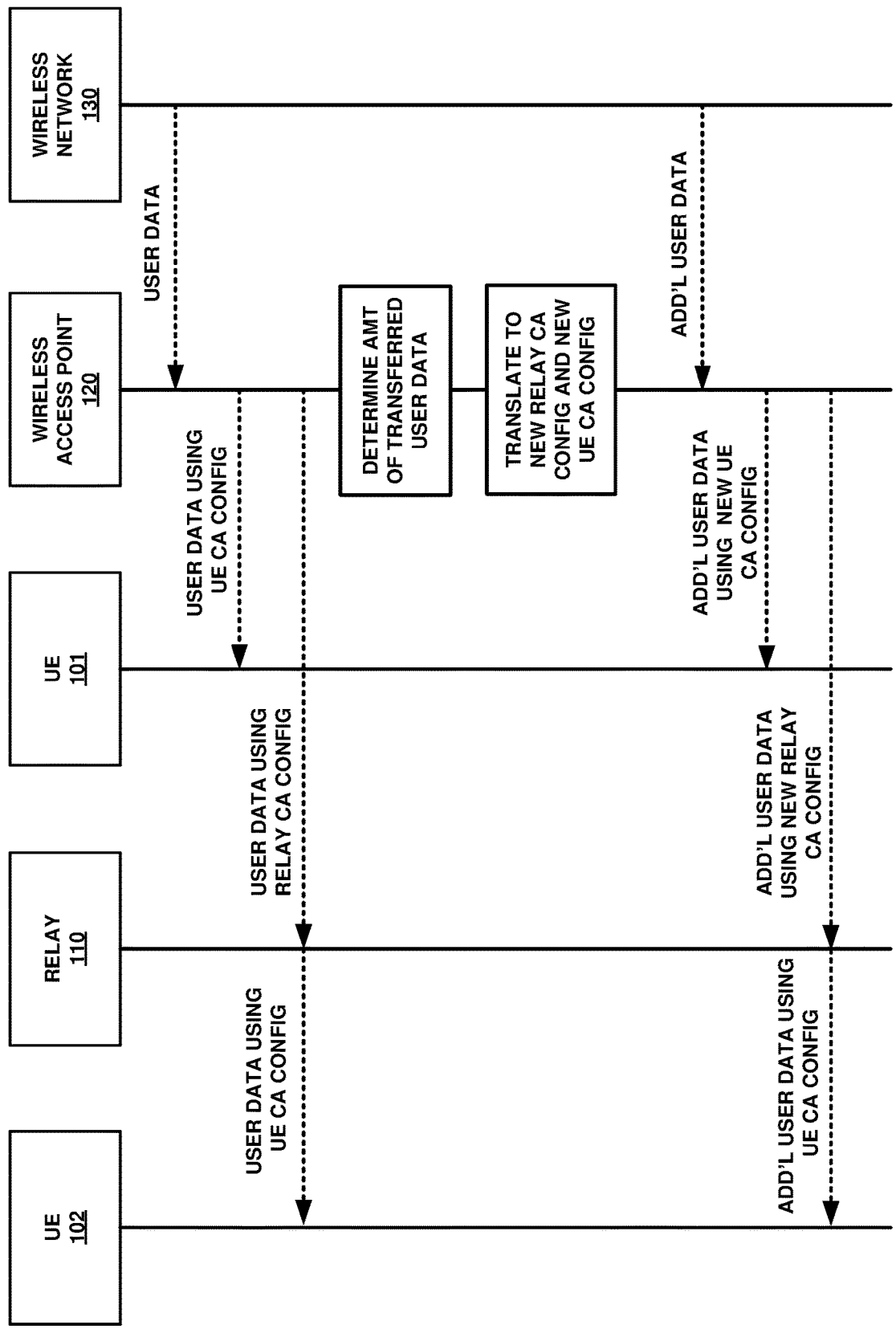

FIGS. 1-3 illustrate wireless communication system 100 to control Carrier Aggregation (CA) at a wireless relay. Wireless communication system 100 transfers data between User Equipment (UEs) to provide data communication services, like internet access, media streaming, voice calls, user messaging, among other services. Referring to FIG. 1, wireless communication system 100 comprises User Equipment (UE) 101, UE 102, wireless relay 110, wireless access point 120, and communication network 130. UE 101 communicates with wireless access point 120 over wireless link 140. UE 102 communicates with wireless relay 110 over wireless link 141. Wireless relay 110 communicates with wireless access point 120 over wireless link 142. Wireless access point 120 communicates with communication network 130 over communication link 143.

UEs 101-102 could be a phone, tablet computer, media device, intelligent machine, or some other apparatus having a wireless communication transceiver. UEs 101-102 include processing circuitry and memory that store and execute various software modules. UEs 101-102 comprise communication transceivers, such as antennas, ports, bus interfaces, signal processors, memory, and software. UEs 101-102 are capable to using CA for exchanging data with wireless relay 110 and wireless access point 120. CA allows UEs 101-102 to exchange a greater amount of data over a shorter period of time by scheduling multiple resource blocks. UEs 101-102 may use a primary component carrier to exchange signaling and data over a primary uplink carrier and one or more secondary component carriers to exchange additional data over additional uplink carriers.

Wireless relay 110 may comprise a mini-macro cell, a femtocell, a picocell, or some other wireless base station capable of providing wireless communication services to UE 102. Wireless access point 120 may comprise a macro base station, a wireless hotspot, an evolved NodeB (eNodeB), or some other base station that may provide wireless communication services to UE 101 directly and UE 102 over wireless relay 110. Wireless relay 110 and wireless access point 120 each include communication interfaces, microprocessors, storage systems, or some other processing systems or software systems, and may be distributed among multiple devices.

In particular, wireless relay 110 and wireless access point 120 may be configured to provide wireless coverage to one or more UEs for voice calls, media streaming, internet access, text messages, and the like. Wireless relay 110 is capable of transferring user data to UE 102 using UE CA. Wireless access point 120 is capable of transferring user data to wireless relay 110 using relay CA and user data to UE 101 using UE CA. Wireless access point 120 is also capable of determining an amount of transferred user data and translating the amount of user data into a new UE CA configuration and a new relay CA configuration.

Wireless links 140-142 may use air or space to transport media. Wireless links 140-141 may use protocols, such as Long Term Evolution (LTE) and Orthogonal Frequency Division Multiplexing (OFDM). Wireless link 142 may use protocols, such as LTE, OFDM, Code Division Multiple Access (CDMA), LTE Wireless Aggregation (LWA), Internet Protocol (IP), Wireless Fidelity (WiFi), or some other wireless communication format—including combinations thereof.

Communication link 143 may use metal, glass, optics, air, space, or some other material as the transport media. Communication link 143 may use Time Division Multiplexing (TDM), IP, Ethernet, Synchronous Optical Networking (SONET), communication signaling, wireless communications, or some other communication format—including improvements thereof. Communication link 143 may be a direct link, or can include intermediate networks, systems, or devices, and can include a logical network link transported over multiple physical links.

In operation, wireless access point 120 wirelessly receives user data. User data may include attachment and registration information to establish signaling between UEs 101-102 and wireless relay 110 with communication network. The user data may comprise an Access Point Number (APN) data set for UEs 101-102 and wireless relay 110. The user data may characterize established bearer data, such as Quality-of-Service (QoS) Class Indicators (QCIs).

Wireless access 120 transfers a first portion of the user data to UE 101 using a UE CA configuration and a second portion of the user data to wireless relay 110 using a relay CA configuration. Wireless networks can aggregate carriers over frequencies bands using Intra-Band Contiguous CA, Intra-Band Non-Contiguous CA, and Inter-Band CA. Intra-Band Contiguous CA uses component carriers that are in the same frequency band and are adjacent to each other. Intra-Band Non-Contiguous CA uses component carriers that are in the same frequency band but are not adjacent to each other. Inter-Band CA uses component carriers that are in different frequency bands.

In a next operation, wireless access point 120 determines an amount of the transferred user data. Wireless access point 120 translates the amount of the transferred user data into a new UE CA configuration and a new relay CA configuration. The new UE CA configuration and the new relay CA configuration may include a new resource block allocation schedule, disablement of a percentage of the UE CA configuration, or complete disablement of the UE CA configuration. The new UE CA configuration and the new relay CA configuration may further include an Interband Contiguous channel allocation configuration, and Interband Non-Contiguous channel allocation configuration, or an Intraband Non-Contiguous channel allocation configuration.

In a final operation, wireless access point 120 wirelessly receives additional user data and transfers a portion of the additional user data to UE 101 using the new UE CA configuration and a second portion of the additional user data to wireless relay 110 using the new relay CA configuration. Advantageously, this allows optimal resource allocation management for wireless relay 110 serving additional wireless relays and UEs, such as UE 102, which may result in better utilization of backhaul resources and downlink throughput for the sector served by wireless access point 120.

FIG. 2 is a flow diagram illustrating an operation of wireless communication system 100 to control CA at a wireless relay. Wireless access point 120 wirelessly receives (201) user data and transfers (201) a first portion of the user data to UE 101 using a UE CA configuration and a second portion of the user data to wireless relay 110 using a relay CA configuration. Wireless access point 120 determines (202) an amount of the transferred user data and translates (202) the amount of the transferred user data into a new UE CA configuration and a new relay CA configuration. Wireless access point 120 wirelessly receives (203) additional user data and transfers (203) a first portion of the additional user data to UE 101 using the new UE CA configuration and a second portion of the additional user data to wireless relay 110 using the new relay CA configuration.

FIG. 3 is a sequence diagram illustrating the operation of wireless communication system 100 to control CA at a wireless relay. Wireless access point 120 wirelessly receives user data and transfers a first portion of the user data to UE 101 using a UE CA configuration and a second portion of the user data to wireless relay 110 using a relay CA configuration. For example, wireless access point 120 may receive Voice over LTE (VoLTE) user data, relay backhaul data, and UE video streaming data from communication network 130. Wireless access point 120 may then transfer the VoLTE user data to UE 101 using a UE CA configuration and the relay backhaul data to wireless relay 110 using a relay CA configuration.

In this example, the UE CA configuration may include an Interband Non-Contiguous CA configuration where UE 101 is transferred signaling over a primary component carrier in a first frequency band and VoLTE data over two secondary component carriers in a second frequency band from wireless access point 120. The relay CA configuration may include an Intraband Contiguous CA configuration where wireless relay 110 is transferred signaling over a primary component carrier in a frequency band and relay backhaul data and UE video streaming data over four adjacent secondary component carriers in the same frequency band as the primary component carrier from wireless access point 120.

Wireless access point 120 determines an amount of the transferred user data and translates the amount of the transferred user data into a new UE CA configuration and a new relay CA configuration. In some examples, wireless access point 120 may determine an amount of the user data for a particular APN and translate the amount of the transferred user data for the particular APN into a new UE CA configuration and a new relay CA configuration. In other examples, wireless access point 120 may determine an amount of the user data for a media conference APN and translate the amount of the transferred user data for the media conference APN into a new UE CA configuration and a new relay CA configuration.

For example, wireless access point 120 may determine that UE 101 is receiving VoLTE data based on the particular APN associated with UE 101. Wireless access point 120 may also determine that wireless relay 110 is receiving relay backhaul data and UE video streaming data based on the particular APNs associated with wireless relay 110. Wireless access point 120 may then translate each of the APNs to determine that wireless relay 110 requires a new relay CA configuration with an additional secondary component carrier and a new UE CA configuration with one less secondary component carrier.

In other examples, wireless access point 120 may determine an amount of QCIs for the transferred user data and translate the amount of the transferred user data for the QCIs into a new UE CA configuration and a new relay CA configuration. In other examples, wireless access point 120 may determine an amount of a media service QCIs for the transferred user data and translate the amount of the transferred user data for the media service QCIs into a new UE CA configuration and a new relay CA configuration.

Wireless access point 120 then wirelessly receives additional user data and transfers a first portion of the additional user data to UE 101 using the new UE CA configuration and a second portion of the additional user data to wireless relay 110 using the new relay CA configuration. For example, wireless access point 120 may receive additional relay backhaul data, UE video streaming data, and VoLTE data from communication network 130. Wireless access point 120 may then transfer the additional relay backhaul data and UE video streaming data to wireless relay 110 using an additional component carrier in a second frequency band in addition to the original primary component carrier and four adjacent secondary carriers in the first frequency band. Wireless access point 120 may also transfer the VoLTE user data to UE 101 using the primary component carrier in the first frequency band but only one secondary component carrier in the second frequency band.

Figure 4:
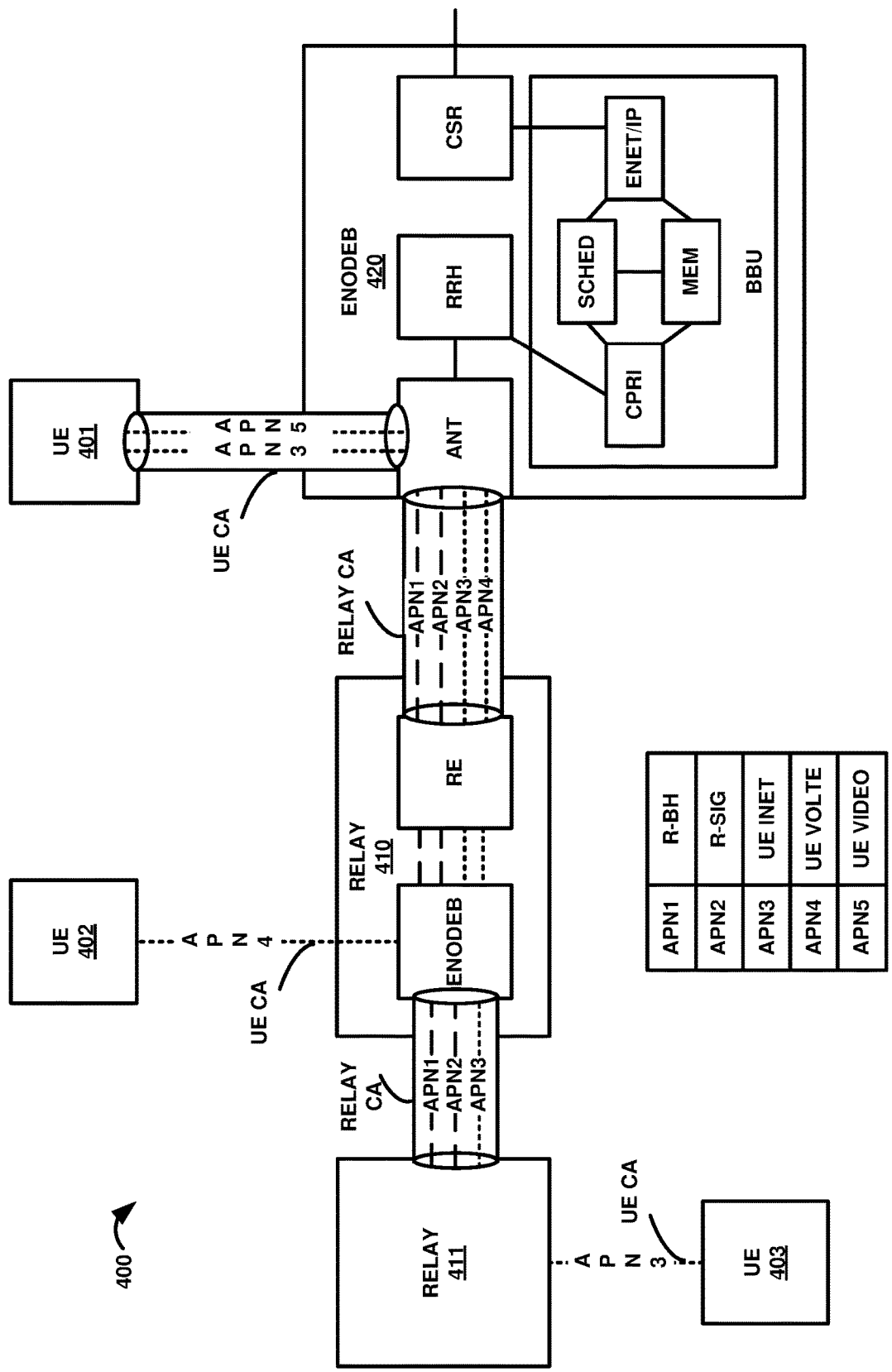
FIGS. 4-5 illustrate a Long Term Evolution (LTE) communication system to control CA at a wireless relay.

FIG. 4 illustrates Long Term Evolution (LTE) communication system 400 to control CA at a relay. LTE communication system 400 is an example of wireless communication system 100, although wireless communication system 100 may use alternative configurations and operations. LTE communication system 400 includes UE 401, UE 402, UE 403, LTE relay 410, LTE relay 411, and eNodeB 420. eNodeB 420 contains an antenna system, a Remote Radio Head (RRH), a Baseband Unit (BBU), and a Cell Switch Router (CSR). The BBU contains a Common Public Radio Interface (CPRI), memory, a resource block scheduler, and an Ethernet interface.

UE 401, UE 402, UE 403, LTE relay 410, and LTE relay 411 are each receiving data and signaling associated with a particular APN from eNodeB 420. As indicated on the table in FIG. 4, APN 1 is associated with relay backhaul data, APN 2 is associated with relay signaling, APN 3 is associated with UE internet access, APN 4 is associated with UE VoLTE calls, and APN 5 is associated with UE video streaming.

UE 401 exchanges UE internet access data (APN 3) and UE video streaming data (APN 5) with eNodeB 420 using a UE CA configuration. LTE relay 410 exchanges relay backhaul data (APN 1), relay signaling data (APN 2), UE internet access data (APN 3), and UE VoLTE call data (APN 4) with eNodeB 420 using a relay CA configuration. UE 402 exchanges UE VoLTE call data (APN 4) with LTE relay 410 using a UE CA configuration. LTE relay 410 exchanges relay backhaul data (APN 1), relay signaling data (APN 2), and UE internet access data (APN 3) with LTE relay 411 using a relay CA configuration. UE 403 exchanges UE VoLTE call data (APN 4) with LTE relay 410 using a UE CA configuration.

In operation, eNodeB 420 wirelessly receives user data associated with APNs 1-5. eNodeB 420 then transfers user data for APNs 3 and 5 to UE 401 using a UE CA configuration of one primary component carrier in a 1.9 gigahertz (GHz) frequency band and two secondary component carriers in a 2.5 GHz frequency band. eNodeB 420 also transfers user data associated with APNs 1-4 to LTE relay 410 using one primary component carrier and two component carriers in the 1.9 GHz frequency band and two secondary component carrier in the 2.5 GHz frequency band.

eNodeB 420 then determines an amount of the transferred user data for each of the particular APNs and translates the amount of the transferred user data into a new UE CA configuration for LTE relay 410 and a new relay CA configuration for UE 401. The new CA configurations may be translated by calculating weighted percentages of total CA availability for each of LTE relay 410 and UE 401 based on a number of APNs and APN type. For example, APNs associated with media conference data may be translated into more CA carriers than an APN associated with relay signaling. eNodeB 420 may also use other techniques to determine and translate the transferred user data into new CA configurations, such as a number of QCIs and QCI types.

In this example, the new relay CA configuration for LTE relay 410 includes an additional secondary component carrier in the 2.5 GHz frequency band and the new UE CA configuration for UE 401 includes one less secondary component carrier in the 2.5 GHz frequency band. In response to determining the new CA configurations, eNodeB 420 sends an instruction indicating the new relay CA configuration to LTE relay 410 and an instruction indicating the new UE relay CA configuration to UE 401. NodeB 420 then wirelessly receives additional user data and transfers the additional user data associated with APNs 3 and 5 to UE 401 using the new UE CA configuration and the additional user data associated with APNs 1-4 to LTE relay 410 using the new relay CA configuration.

Figure 5:
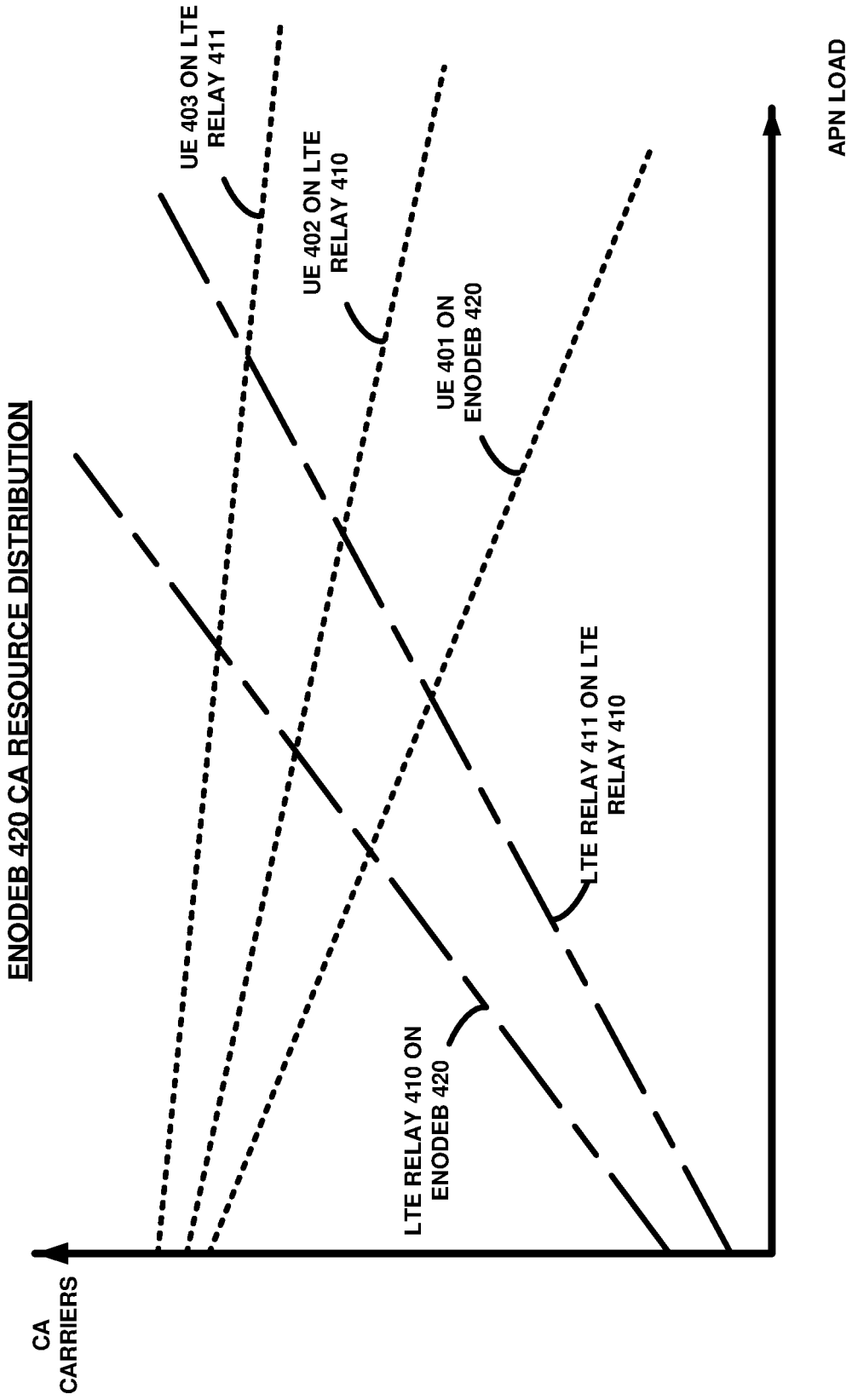

FIG. 5 illustrates a graph of eNodeB 420 to control CA at a relay. As indicated on the graph, the amount of CA carriers used by UE 401, UE 402, UE 403, LTE relay 410, and LTE relay 411 is proportional to the total amount of user data received from by eNodeB 420. In this scenario, the amount of user data is determined based on the APN loading where a particular APN is associated with either relay services or UE services. As the APN loading increases, the amount of CA carriers allocated to LTE relay 410 on eNodeB 420 and LTE relay 411 on LTE relay 410 increases. In contrast, as the amount of APN loading increases, the amount of CA carriers allocated to UE 401 on eNodeB 420, UE 402 on LTE relay 410, and UE 403 on LTE relay 411 decreases.

Still referring to FIG. 5, the amount of CA carriers allocated to LTE relay 411 may increase at a lower rate than LTE relay 410 due to the particular APNs used by each of the LTE relays and the weighted percentages associated with those particular APNs. On the other hand, the amount of CA carriers allocated to UE 402 on LTE relay 410 and UE 403 on LTE relay 411 may decrease at a lower rate due to the fact that UE 402 and UE 403 are likely located further away from eNodeB 420 and therefore cause less interference with other relays and UEs directly linked to eNodeB 420. However, it should be noted that other distribution curves are available depending on the number and type of APNs used by each of LTE relays 410-411 and UEs 401-403.

Figure 6:
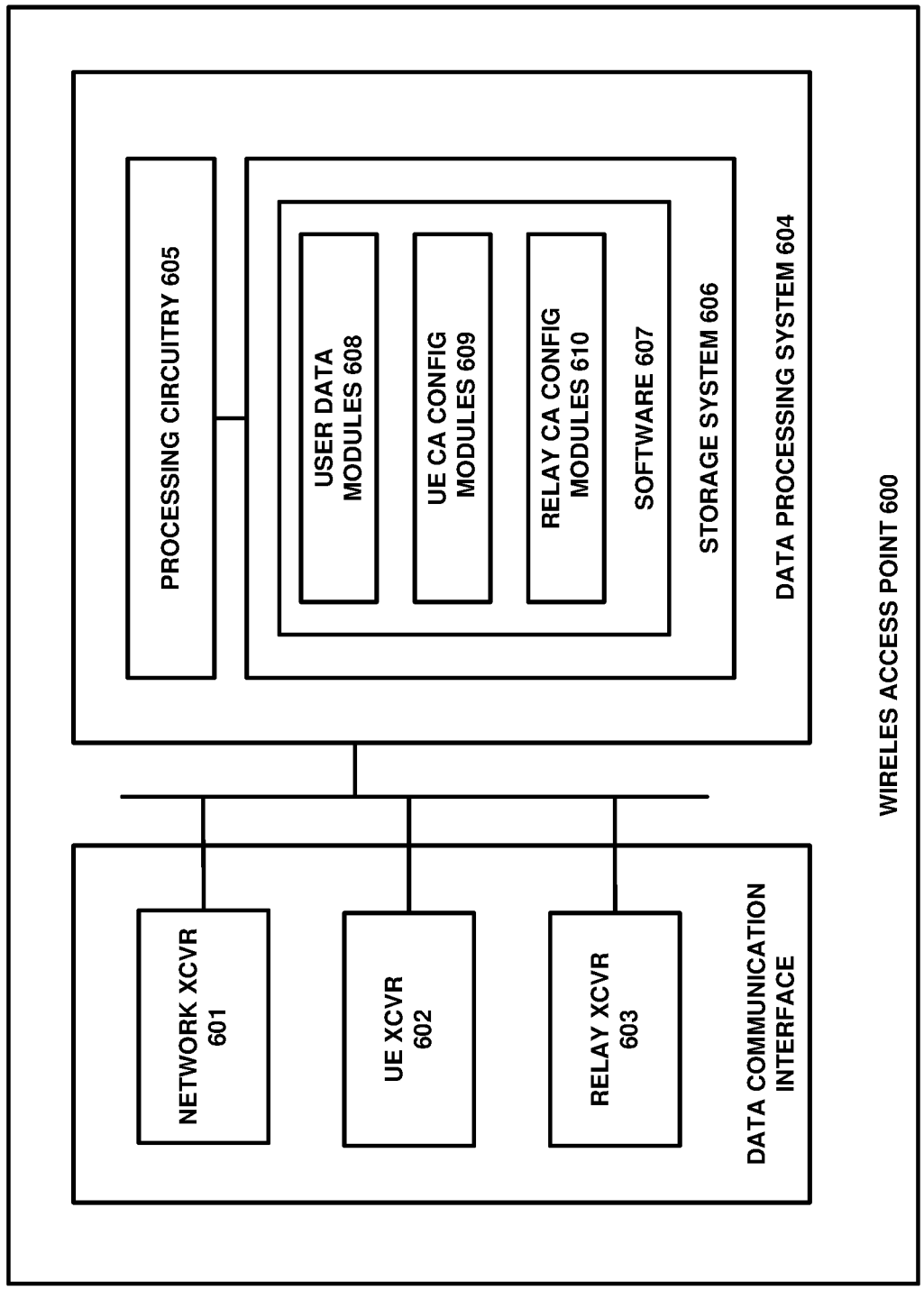
FIG. 6 illustrates a wireless access point to control CA at a wireless relay.

FIG. 6 illustrates wireless access point 600 to control CA for a relay. Wireless access point 600 is an example of wireless access point 120 and eNodeB 420, although wireless access point 120 and eNodeB 420 may use alternative configurations and operations. Wireless access point 600 includes a data communication interface system comprising network transceiver 601, UE transceiver 602, and relay transceiver 603. Wireless relay 600 also contains data processing system 604. Data processing system 604 is linked to network transceiver 601, UE transceiver 602, and relay transceiver 603.

Network transceiver 601, UE transceiver 602, and relay transceiver 603 comprise communication components, such as antennas, ports, amplifiers, filters, modulators, signal processors, and the like. Network transceiver 601 may be configured to use TDM, IP, Ethernet, WDM, SONET, communication signaling, wireless communications, or some other communication format—including improvements thereof. UE transceiver 602 and relay transceiver 603 may be configured to use LTE, CDMA, OFDMA, LWA, IP, WiFi, or some other wireless communication format—including combinations thereof.

In particular, network transceiver 601 may be configured to receive user data from a data communication network. UE transceiver 602 may be configured to transfer user data to a UE using a UE CA configuration and additional user data to the UE using a new UE CA configuration. Relay transceiver 603 may be configured to transfer user data to a wireless relay using a relay CA configuration and additional user data to the wireless relay using a new relay CA configuration.

Data processing system 604 includes processing circuitry 605 and storage system 606 that stores software 607. Processing circuitry 605 comprises a microprocessor and other circuitry that retrieves and executes software 607 from storage system 606. Storage system 606 comprises a non-transitory storage medium, such as a disk drive, flash drive, data storage circuitry, or some other memory apparatus. Software 607 comprises computer programs, firmware, or some other form of machine-readable processing instructions. Software 607 may further include an operating system, utilities, drivers, network interfaces, applications, or some other type of software. When executed by processing circuitry 605, software 607 directs processing system 604 to operate wireless relay 600 as described herein.

In particular, when executed by processing circuitry 605, user data module 608 directs processing circuitry 605 to receive user data from data communication network. When executed by processing circuitry 605, user data module 608 also directs processing circuitry 605 to determine an amount of the transferred user data. When executed by processing circuitry 605, UE CA configuration module 609 directs processing circuitry 605 to transfer a first portion of the user data to a wireless UE using a UE CA configuration. When executed by processing circuitry 605, UE CA configuration module 609 also directs processing circuitry 605 to translate the amount of user data into a new UE CA configuration. When executed by processing circuitry 605, UE CA configuration module 609 also directs processing circuitry 605 to transfer a first portion of additional user data to the wireless UE using the new UE CA configuration.

When executed by processing circuitry 605, relay CA configuration module 610 directs processing circuitry 605 to transfer a second portion of the user data to a wireless relay using a relay CA configuration. When executed by processing circuitry 605, relay CA configuration module 610 also directs processing circuitry 605 to translate the amount of user data into a new relay CA configuration. When executed by processing circuitry 605, relay CA configuration module 610 also directs processing circuitry 605 to transfer a second portion of additional user data to the wireless relay using the new relay CA configuration.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication system to control Carrier Aggregation (CA), the method comprising:
   a wireless access point wirelessly transferring first user data to a first set of User Equipment (UEs) using multiple Quality-of-Service (QoS) levels in first carrier-aggregated resource blocks according to an initial UE CA schedule and wirelessly transferring second user data to a wireless relay in second carrier-aggregated resource blocks according to an initial relay CA schedule;
   the wireless relay wirelessly receiving the second user data in the second carrier-aggregated resource blocks according to the initial relay CA schedule and wirelessly transferring the second user data to a second set of UEs;
   the wireless access point translating an amount of the first user data for at least one of the QoS levels into a new UE CA schedule and a new relay CA schedule, transferring third user data to the first set of the UEs in third carrier-aggregated resource blocks according to the new UE CA schedule, and wirelessly transferring fourth user data to the wireless relay in fourth carrier-aggregated resource blocks according to the new relay CA schedule; and
   the wireless relay wirelessly receiving the fourth user data in the fourth carrier-aggregated resource blocks according to the new relay CA schedule and wirelessly transferring the fourth user data to the second set of the UEs.

2. The method of claim 1 wherein the initial relay CA schedule comprises an interband contiguous channel allocation and the new relay CA schedule comprises an interband non-contiguous channel allocation.

3. The method of claim 1 wherein the initial relay CA schedule comprises an interband contiguous channel allocation and the new relay CA schedule comprises an intraband non-contiguous channel allocation.

4. The method of claim 1 wherein the initial relay CA schedule comprises an interband contiguous channel allocation and the new relay CA schedule comprises an intraband non-contiguous channel allocation.

5. The method of claim 1 wherein the initial UE CA schedule comprises an interband contiguous channel allocation and the new UE CA schedule comprises an interband non-contiguous channel allocation.

6. The method of claim 1 wherein the initial UE CA schedule comprises an interband contiguous channel allocation and the new UE CA schedule comprises an intraband non-contiguous channel allocation.

7. The method of claim 1 wherein the initial UE CA schedule comprises an interband contiguous channel allocation and the new UE CA schedule comprises an intraband non-contiguous channel allocation.

8. The method of claim 1 wherein the wireless access point translating the amount of the first user data into the new UE CA schedule and the new relay CA schedule comprises the wireless access point translating the amount of the first user data for a Quality-of-service Class Indicator (QCI) into the new UE CA schedule and the new relay CA schedule.

9. The method of claim 1 wherein the wireless access point translating the amount of the first user data into the new UE CA schedule and the new relay CA schedule comprises the wireless access point translating the amount of the first user data for a wireless media service into the new UE CA schedule and the new relay CA schedule.

10. A wireless communication system to control Carrier Aggregation (CA), the wireless communication system comprising:
a wireless access point configured to wirelessly transfer first user data to a set of first User Equipment (UEs) using multiple Quality-of-Service (QoS) levels in first carrier-aggregated resource blocks according to an initial UE CA schedule and wirelessly transfer second user data to a wireless relay in second carrier-aggregated resource blocks according to an initial relay CA schedule;
the wireless relay configured to wirelessly receive the second user data in the second carrier-aggregated resource blocks according to the initial relay CA schedule and wirelessly transfer the second user data to a second set of UEs;
the wireless access point configured to translate an amount of the first user data for at least one of the QoS levels into a new UE CA schedule and a new relay CA schedule, wirelessly transfer third user data to the first set of the UEs in third carrier-aggregated resource blocks according to the new UE CA schedule, and wirelessly transfer fourth user data to the wireless relay in fourth carrier-aggregated resource blocks according to the new relay CA schedule; and
the wireless relay configured to wirelessly receive the fourth user data in the fourth carrier-aggregated resource blocks according to the new relay CA schedule and wirelessly transfer the fourth user data to the second set of the UEs.

11. The wireless communication system of claim 10 wherein the initial relay CA schedule comprises an interband contiguous channel allocation and the new relay CA schedule comprises an interband non-contiguous channel allocation.

12. The wireless communication system of claim 10 wherein the initial relay CA schedule comprises an interband contiguous channel allocation and the new relay CA schedule comprises an intraband non-contiguous channel allocation.

13. The wireless communication system of claim 10 wherein the initial relay CA schedule comprises an interband contiguous channel allocation and the new relay CA schedule comprises an intraband non-contiguous channel allocation.

14. The wireless communication system of claim 10 wherein the initial UE CA schedule comprises an interband contiguous channel allocation and the new UE CA schedule comprises an interband non-contiguous channel allocation.

15. The wireless communication system of claim 10 wherein the initial UE CA schedule comprises an interband contiguous channel allocation and the new UE CA schedule comprises an intraband non-contiguous channel allocation.

16. The wireless communication system of claim 10 wherein the initial UE CA schedule comprises an interband contiguous channel allocation and the new UE CA schedule comprises an intraband non-contiguous channel allocation.

17. The wireless communication system of claim 10 wherein the wireless access point is configured to translate the amount of the first user data for a Quality-of-service Class Indicator (QCI) into the new UE CA schedule and the new relay CA schedule.

18. The wireless communication system of claim 10 wherein the wireless access point is configured to translate the amount of the first user data for a wireless media service into the new UE CA schedule and the new relay CA schedule.

* * * * *